United States Patent
Zheng et al.

(10) Patent No.: US 12,136,155 B2
(45) Date of Patent: Nov. 5, 2024

(54) SYSTEM AND METHOD FOR PHOTOREALISTIC IMAGE SYNTHESIS USING UNSUPERVISED SEMANTIC FEATURE DISENTANGLEMENT

(71) Applicant: CARNEGIE MELLON UNIVERSITY, Pittsburgh, PA (US)

(72) Inventors: Yutong Zheng, Pittsburgh, PA (US); Marios Savvides, Pittsburgh, PA (US); Yu Kai Huang, Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 0 days.

(21) Appl. No.: 18/269,721

(22) PCT Filed: Feb. 9, 2022

(86) PCT No.: PCT/US2022/015797
§ 371 (c)(1),
(2) Date: Jun. 26, 2023

(87) PCT Pub. No.: WO2022/173814
PCT Pub. Date: Aug. 18, 2022

(65) Prior Publication Data
US 2024/0062441 A1 Feb. 22, 2024

Related U.S. Application Data

(60) Provisional application No. 63/149,375, filed on Feb. 15, 2021.

(51) Int. Cl.
*G06T 11/60* (2006.01)
*G06T 9/00* (2006.01)
(Continued)

(52) U.S. Cl.
CPC ............... *G06T 11/60* (2013.01); *G06T 9/00* (2013.01); *G06V 10/44* (2022.01); *G06V 40/171* (2022.01)

(58) Field of Classification Search
CPC . G06T 11/60; G06T 9/00; G06T 7/246; G06T 2207/20084; G06V 40/171;
(Continued)

(56) References Cited

U.S. PATENT DOCUMENTS

| 11,250,245 B2 * | 2/2022 | Todorov | G06V 10/82 |
| 2018/0365874 A1 * | 12/2018 | Hadap | G06N 3/045 |

(Continued)

FOREIGN PATENT DOCUMENTS

| WO | WO-2020091891 A1 * | 5/2020 | G06F 18/2135 |
| WO | WO-2021178936 A1 * | 9/2021 | G06N 3/0454 |

OTHER PUBLICATIONS

Heinrich (here is referred as Heinrich-2), Apr. 24, 2017, Photo Editing with Generative Adversarial Networks (Part 2) (pp. 1-30) (Year: 2017).*

(Continued)

*Primary Examiner* — Manav Seth
(74) *Attorney, Agent, or Firm* — KDW Firm PLLC

(57) ABSTRACT

Disclosed herein is a method to disentangle linear-encoded facial semantics from facial images without external supervision. The method uses linear regression and sparse representation learning concepts to make the disentangled latent representations easily interpreted and manipulated. Generated facial images are decomposed into multiple semantic features and latent representations are extracted to capture interpretable facial semantics. The semantic features may be manipulated to synthesize photorealistic facial images by sampling along vectors representing the semantic features, thereby changing the associate semantics.

14 Claims, 4 Drawing Sheets

(51) Int. Cl.
*G06V 10/44* (2022.01)
*G06V 40/16* (2022.01)

(58) Field of Classification Search
CPC .......... G06V 10/44; G06N 3/08; G06N 3/088; G06N 20/00; G06K 9/6256
See application file for complete search history.

(56) References Cited

U.S. PATENT DOCUMENTS

| | | | |
|---|---|---|---|
| 2019/0295302 A1* | 9/2019 | Fu | G06V 10/82 |
| 2020/0184660 A1 | 6/2020 | Shi | |
| 2021/0150369 A1* | 5/2021 | Karras | G06N 3/047 |
| 2021/0398335 A1* | 12/2021 | Hu | G06T 7/30 |
| 2022/0028139 A1* | 1/2022 | Mitra | G06V 40/175 |
| 2022/0138897 A1* | 5/2022 | Singh | G06T 3/147 |
| | | | 382/159 |
| 2024/0146963 A1* | 5/2024 | Chen | H04N 19/597 |

OTHER PUBLICATIONS

Heinrich (here is referred as Heinrich-1), Apr. 20, 2017, Photo Editing with Generative Adversarial Networks (Part 1) (pp. 1-19) (Year: 2017).*
Karras et al., 2019, "A Style-Based Generator Architecture for Generative adversarial Networks" (pp. 1-12). (Year: 2019).*
Abdal et al., 2020, "Image2StyleGAN++: How to Edit the Embedded Images?" (pp. 8296-8305) (Year: 2020).*
Collins et al., 2020, "Editing in Style: Uncovering the Local Semantics of GANs" (pp. 5771-5780) (Year: 2020).*
Papastraits, 2020, "Deepfakes: Face synthesis with GANs and Autoencoders" (pp. 1-10) (Year: 2020).*
Zhu et al., 2020, "In-Domain Gan Inversion for Real Image Editing" (pp. 592-608). (Year: 2020).*
International Search Report and Written Opinion for the International Application No. PCT/US22/15797, mailed May 23, 2022, 7 pages.

* cited by examiner (a) original training protocol fails.

(b) mutual reconstruction strategy stabilizes training.

SYSTEM AND METHOD FOR PHOTOREALISTIC IMAGE SYNTHESIS USING UNSUPERVISED SEMANTIC FEATURE DISENTANGLEMENT

RELATED APPLICATIONS

This application claims the benefit of U.S. Provisional Patent Application No. 63/149,375, filed Feb. 15, 2021, the contents of which are incorporated herein in their entirety.

BACKGROUND

Generative Adversarial Networks (GANs) have realized great success in synthesizing photo-realistic images, given a set of latent codes. Despite the rapid boost in image quality, the interpretability of the generation process has become another major area of research. In general, interpretability requires latent codes to encode disentangled semantic information of the image. Further, ideally, well-disentangled semantics are supposed to be factorized to practically interpretable components and each component should be linear-encoded in the latent space as representation.

StyleGAN is a GAN for producing an unlimited number of (often convincing) portraits of fake human faces. The StyleGAN architecture provides an intermediate latent space to support the disentanglement property for face generation. Consequently, facial semantics are linear-encoded as latent representations.

Based on StyleGAN, sampling along a linear-encoded representation vector in latent space will change the associated facial semantic accordingly. This makes it possible to manipulate face generations to meet a target requirement. However, mapping particular facial semantics to a latent representation vector relies on training offline classifiers with manually labeled datasets. Thus, they require artificially defined semantics and provide the associated labels for all facial images. The disadvantages for training with labeled facial semantics include: (1) extra effort demanded on human annotations for each new attributes proposed; (2) each semantics is defined artificially, and the scope of semantics is limited to the linear combination of such definitions; and (3) by only training on each of the labeled semantics independently, insights on the connections among different semantics are unavailable.

SUMMARY

Disclosed herein is a system and method for manipulating linear-encoded facial semantics from facial images generated by StyleGAN without external supervision. The method derives from linear regression and sparse representation learning concepts to make the manipulated latent representations easily interpreted. The method starts by coupling StyleGAN with a stabilized 3D deformable facial reconstruction method to decompose single-view GAN generations into multiple semantics. Latent representations are then extracted to capture interpretable facial semantics.

The disclosed invention provides an unsupervised method to minimize the demand for human annotation. A novel unsupervised framework is specified to disentangle and manipulate facial semantics under the StyleGAN environment, while still maintaining the interpretability for semantics as in labeled datasets.

FIG. 1 shows facial manipulation results produced by sampling along latent representations in StyleGAN, learned by the unsupervised framework disclosed herein. Column 1 shows original generations. Columns 2-4 show manipulation on univariate environmental semantics. Columns 5-9 show manipulation on localized facial semantics.

The disclosed framework uses decorrelation regularization on StyleGAN to further enhance disentanglement for the latent representations. In addition, mutual reconstruction is introduced to stabilize training of an unsupervised 3D deformable face reconstruction method, such that it serves as an initial facial semantic extractor.

For univariate semantics (e.g., yaw angle, pose, lighting) a linear regression method to capture perturbations from latent space is disclosed. For pixel-level semantics (e.g., shape and texture), a localized representation learning algorithm is disclosed to capture sparse semantic perturbations from latent space.

All methods disclosed herein are based on a label-free training strategy. Only StyleGAN is trained with an in-the-wild face dataset. Therefore, a significant amount of human involvement in facial representation learning is not needed.

The goal of the facial representation disentanglement method disclosed herein is to capture linear-encoded facial semantics. With a given collection of coarsely aligned faces, a Generative Adversarial Network (GAN) is trained to mimic the overall distribution of the data. To better learn linear-encoded facial semantics, StyleGAN is re-implemented and trained. Further, the method improves the capability of the latent space trained by StyleGAN to disentangle by adding a decorrelation regularization. After training a StyleGAN model, the faces it generates are used as training data to train a 3D deformable face reconstruction method. A mutual reconstruction strategy stabilizes the training significantly. Then, a record is kept of the latent code from StyleGAN and linear regression is applied to disentangle the target semantics in the latent space.

Taking the reconstruction of the yaw angle as an example, the latent representation is manipulated as a data augmentation for training. Finally, a localized representation learning method to disentangle canonical semantics is disclosed.

BRIEF DESCRIPTION OF THE DRAWINGS

By way of example, a specific exemplary embodiment of the disclosed system and method will now be described, with reference to the accompanying drawings, in which.

DETAILED DESCRIPTION

Decorrelating Latent Code in StyleGAN—In StyleGAN design, a latent code $z \in \mathcal{Z}^{d \times 1}$ is randomly generated from random noise, for example a Gaussian distribution. Then, a mapping network takes z as input and outputs a latent code $w \in \mathcal{W}^{d \times 1}$. Space $\mathcal{W}$ is proven to facilitate the learning of more disentangled representations. The disentangled representation can be further enhanced by decorrelating latent codes in $\mathcal{W}$. A more decorrelated latent space enforces more independent dimensions to encode information, and therefore encourages disentanglement in representations. To maximize the utilization of all dimensions in $\mathcal{W}$, all Pearson correlation coefficients $p_{ij}$ should be zero and the variance of all dimensions $\text{Var}[w_i]$ should be the same value, where i, j are the subscripts of dimensions in $\mathcal{W}$ space.

Therefore, decorrelation regularization is introduced via a loss function:

$$\mathcal{L}_{decorr} = -\sum_{i \neq j}(\log(1-|p_{ij}|)) + \sum_{i}\left(\text{Var}[w_i] - \sum_{j}(\text{Var}[w_j])\right)^2 \quad (1)$$

where:

and $p_{ij}$ and $\text{Var}[w_i]$ are estimated by sampling w from the mapping network $\mathcal{F}$ (z), given $z \sim \mathcal{N}$ (0,I).

The overall objective for the GAN with decorrelation regularization follows:

$$\min_{\mathcal{F},\mathcal{G}} \max_{\mathcal{D}} \mathcal{L}_{GAN} + \mathcal{L}_{decorr} \quad (2)$$

where:

$\mathcal{G}$ and $\mathcal{D}$ are the generator and discriminator for the GAN, respectively.

Here the mapping network $\mathcal{F}$ is the only one to update with the new loss, $\mathcal{L}_{decorr}$.

Stabilized Training for 3D Face Reconstruction—An unsupervised 3D deformable face reconstruction method takes a roughly aligned face image and decomposes the faces into multiple semantics (e.g., view, lighting, albedo, and depth ($y_v, y_l, y_a$ and $y_d$, respectively). During training, it uses these decomposed semantics to reconstruct the original input image I with the reconstruction loss:

$$\mathcal{L}_{recon} = \mathcal{C}(I)^- |I - \hat{I}| \quad (3)$$

where:

$\hat{I} = \mathcal{R}(y_v, y_l, y_a, y_d)$;

$\mathcal{C}$ is a confidence network; and $\mathcal{R}$ is a 3D face renderer.

This method is used to pre-decompose some external facial semantics (e.g., pose and lighting), from StyleGAN generations.

Figure 1:
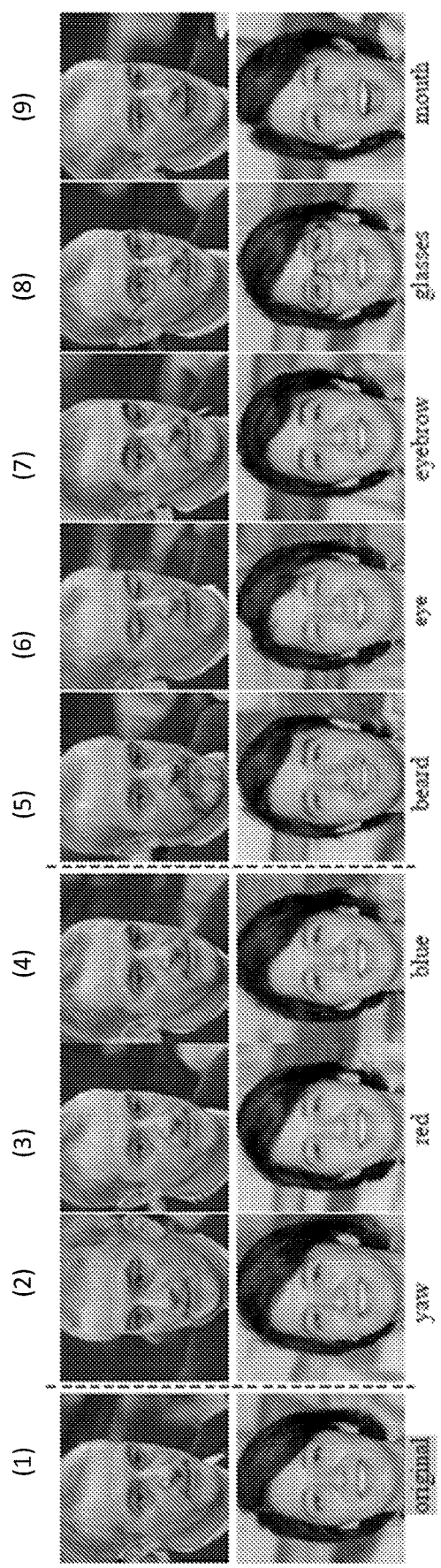
FIG. 1 illustrates facial manipulation results by sampling along latent representations learned by the unsupervised framework disclosed herein.
Figure 2:
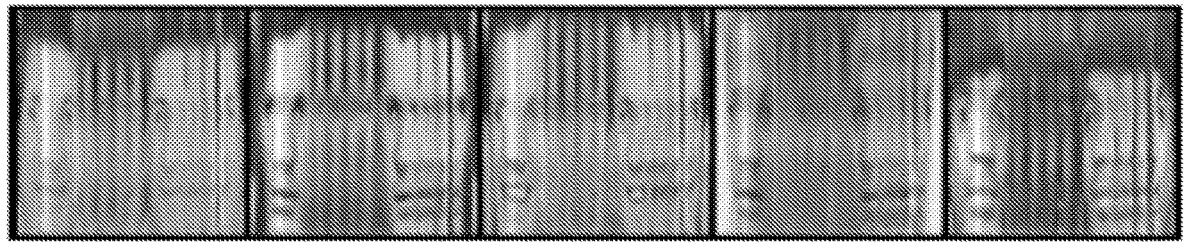
FIG. 2 is an illustration showing the canonical albedo map of samples in CASIA WebFace after training.
Figure 2:
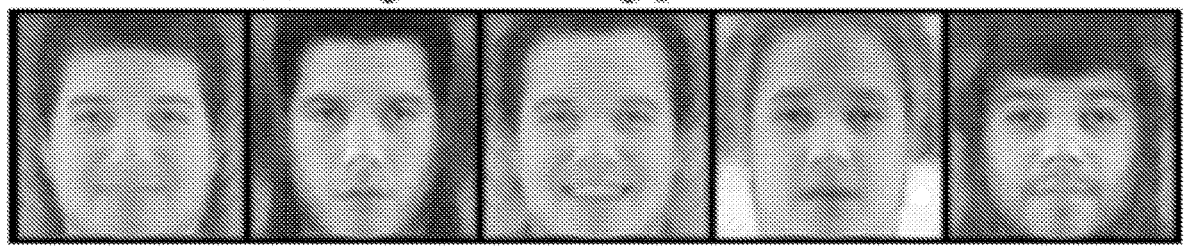

However, the 3D face reconstruction algorithm struggles to estimate the pose of profile or near-profile faces. Even worse, if the dataset contains a decent number of profile and near-profile faces (e.g., CASIA WebFace), the 3D reconstruction fails to learn physically sounded semantics, as shown in FIG. 2(a), and collapses into a sub-optimal state. That is, the algorithm tries to use extreme values to estimate the texture and shape of each face independently, which deviates far away from the actual texture and shape of the face.

Figure 3:
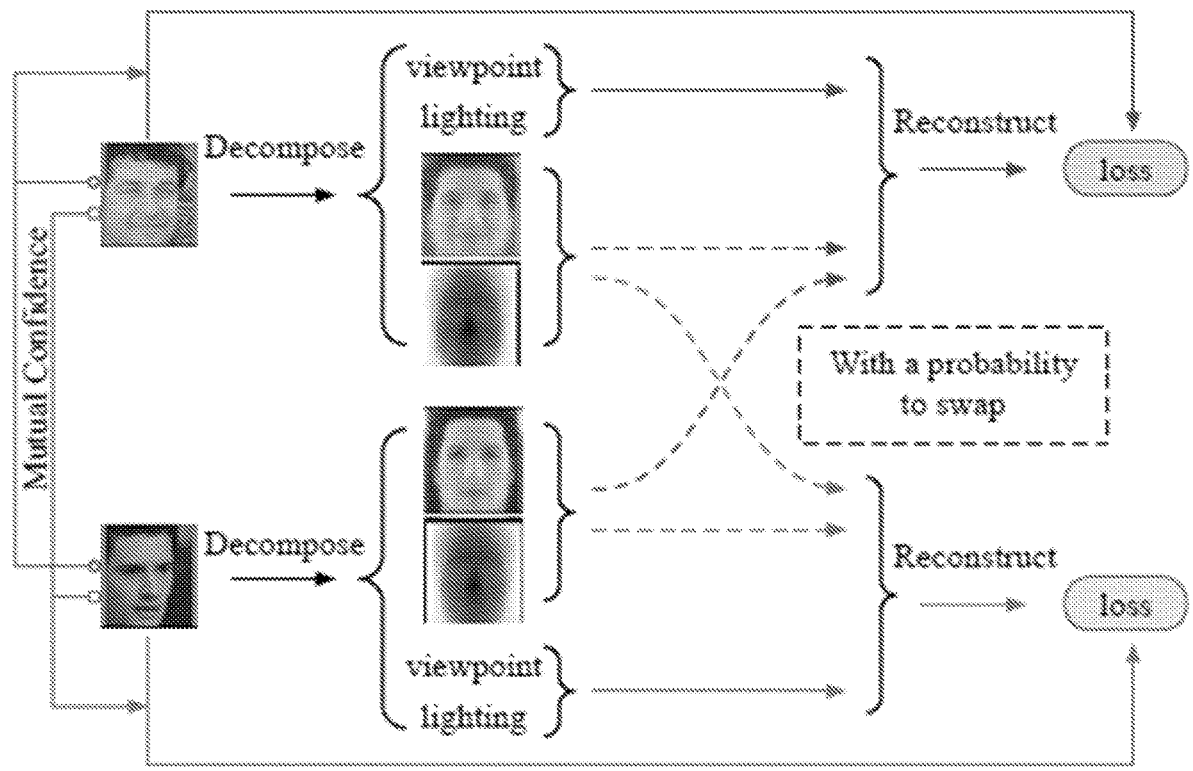
FIG. 3 is a schematic diagram showing implementation of mutual reconstruction during training.

To address this problem, a mutual reconstruction strategy is disclosed and is and is illustrated in FIG. 3. In general, human faces are very similar in shape and texture. Therefore, each face image should still be able to reconstruct itself comparatively if its shape and texture are swapped with another face. Eventually, the strategy prevents the model from using extreme values to fit individual reconstruction, and the model learns to reconstruct faces with a minimum variance of the shape and texture among all samples, even for profile faces, as shown in FIG. 2(b). Following this idea, during training, the albedo and depth map between two images are swapped with a probability $\epsilon$ to perform the reconstruction with the alternative loss:

$$\tilde{\mathcal{L}}_{recon} = \tilde{\mathcal{C}}(I,I')^- |I - \hat{I}'| \quad (4)$$

where:

$\hat{I}' = \mathcal{R}(y_v, y_l, y_a', y_d')$;

$\tilde{\mathcal{C}}$ is a mutual confidence network; and all terms with a prime notation (') originate from another image I'.

The overall loss to reconstruct each image then becomes:

$$(1-\epsilon)\mathcal{L}_{recon} + \epsilon \tilde{\mathcal{L}}_{recon} \quad (5)$$

As a result, the shape and texture of faces with deviated facial semantics can be robustly estimated. Moreover, because images are now reconstructed from two images, the confidence map in the original work should be yielded by these two images accordingly. The two images are simply concatenated channel-wise as input to the confidence network, where the top image provides environmental semantics and the bottom image provides texture and shape information.

Disentangle Semantics with Linear Regression—With the 3D face reconstruction algorithm, face images generated by StyleGAN are decomposed to pose, lighting, depth, and albedo. The ultimate goal of disentangling semantics is to find a vector $v \in \mathcal{W}$ in StyleGAN, such that it only takes control of the target semantics.

Semantic Gradient Estimation—Consider a semantics y of a generated face image $\mathcal{G}$ (w) that can be measured by a function $f(\cdot)$. The linear approximation of the gradient $\nabla_y$ with respect to the latent code w satisfies:

$$f(\mathcal{G}(w_1)) \approx f(\mathcal{G}(w_0)) + \nabla_y(w_0)^\top (w_1 - w_0) \quad (6)$$

Note that in general, the gradient at location $w_0$, $\nabla_y(w_0)$, is a function of latent code $w_0$. However, with StyleGAN, it is observed that many semantics can be linear-encoded in the disentangled latent space $\mathcal{W}$. It can therefore be assumed that all of the semantics can be linear-encoded. In other words, the gradient is now independent of the input latent code $w_0$. This yields:

$$f(\mathcal{G}(w_1)) \approx f(\mathcal{G}(w_0)) + \nabla_y^\top (w_1 - w_0)$$

simplified as:

$$\Delta y \approx \nabla_y^\top \Delta w \quad (7)$$

where:

$\Delta y = f(\mathcal{G}(w_1)) - f(\mathcal{G}(w_0))$; and $\Delta w = w_1 - w_0$.

Semantic Linear Regression—It is now obvious that in the ideal case, the target vector $v = \nabla_y$. While in a real world scenario, the gradient $\nabla_y$ is hard to estimate directly because back-propagation only captures local gradient, making it less robust to noises. Therefore, a linear regression model to capture global linearity for gradient estimation is disclosed. N pairs of ($w_1$, $w_0$) are randomly sampled. Images are generated with StyleGAN and their semantics are estimated. Finally, all samples of differences are concatenated, denoted as $\Delta Y \in \mathbb{R}^{N \times 1}$ for semantics and $\Delta W \in \mathbb{R}^{N \times d}$ for latent codes. The objective is to minimize:

$$\min_v \|\Delta Y - \Delta W v\|_2^2 \quad (8)$$

There exists a closed-form solution when N>d:

$$v = (\Delta W^\top \Delta W)^{-1} \Delta W^\top \Delta Y \quad (9)$$

Image Manipulation for Data Augmentation—One useful application for guided image manipulation is to perform data augmentation. Data augmentation has proven to be efficient when dealing with unbalanced data during training. One related problem within an unsupervised framework is the inaccurate estimation of extreme yaw angle. This problem worsens when dealing with generations from CASIA Style-GAN because it contains a large number of facial images, only a small portion of which are profile faces (i.e., an unbalanced yaw distribution).

Disclosed herein is a data augmentation strategy based on self-supervised facial image manipulation. The end goal is to help the 3D face reconstruction network estimate the extreme yaw angle accurately. With the linear regression method previously discussed, manipulation vectors v for univariate semantics, including the yaw angle, denoted as $v_{yaw}$, can be learned. Recall that extrapolating along v beyond its standard deviation, yields samples with more extreme values for the associated semantics. Particularly, images with an extreme yaw angle can be generated to neutralize the unbalanced yaw distribution and train the 3D face reconstruction algorithm. Therefore, by seeing more profile faces deliberately, the system can better estimate extreme yaw angles.

The data augmentation strategy is performed alongside the training of 3D face reconstruction. To be specific, v is estimated and updated with a historical moving average (e.g., momentum=0.995) every 10 iterations. Then, augmentation is achieved by extrapolating a latent vector $w_i^{(s)}$ via:

$$w_i^{(s)} = w_i - w_i^\top vv + s \cdot \sigma_w v \quad (10)$$

where:
$w_i$ is a random sample drawn from $\mathcal{F}(z)$;
s is the scaling factor for the interpolation/extrapolation along the unit length manipulation vector v; and
$\sigma_w$ is the standard deviation for $w^\top v$.

In this case $v = v_{yaw}$. Finally, the 3D face reconstruction method is trained with the augmented generations $\mathcal{G}(w_i^{(s)})$.

Localized Representation Learning—In the case where $f(\bullet)$ returns canonical outputs (i.e., depth and albedo maps), the outputs consist of pixels in spatial dimensions wherein the pixel values are highly correlated as the latent code changes. However, every pixel-level gradient estimation (i.e., v from Eq. (9) is independently calculated and is thus extremely redundant. To address this problem, the goal for canonical semantics is re-formulated to find the manipulation vectors I that capture interpretable combinations of pixel value variations. Define a Jacobian matrix $J_v \in \mathcal{R}^{S \times d}$, which is the concatenation of all canonical pixel-level v. Here, S is the overall number of spatial and RGB dimensions of a given depth and albedo map.

One trivial definition of $\hat{v}$ is that it maximizes $\|J_v^* \hat{v}\|_2^2$. Ideally, a disentangled representation to manipulate interpretable facial semantics is expected. That is, interpolation along $\hat{v}$ should result in a significant but localized (i.e., sparse) change across the image domain (e.g., some $\hat{v}$ only control eye variations while some only control mouth variations, etc.). However, $\|J_v^* \hat{v}\|_2^2$ captures the global pixel value perturbation. Thus, the localized canonical representation learning is derived by solving:

$$\min_{U, \hat{V}} \|J_v^* - U\hat{V}^\top\|_F^2 + \alpha \|U\|_1 + \beta \sum_{i \neq j} (\hat{v}_i^\top \hat{v}_j)^2 \quad (11)$$

$$\text{s.t. } \|\hat{v}_p\|_2 = 1$$

where:
p, i, j ∈ {1, ..., P}; and
P is the number of components to learn.

Each column in $U = [u_1, \ldots, u_p] \in \mathcal{R}^{S \times P}$ is a sparse component of the canonical albedo and depth perturbation and $\hat{V} = [\hat{v}_1, \ldots, \hat{v}_P] \in \mathbb{R}^{d \times P}$ consists of the associated latent representation in $\mathcal{W}$ space. α and β are tuning parameters to control the trade-off among the reconstruction accuracy of $J_v^*$, sparsity of perturbation in semantics and orthogonality of associated latent representations.

Figure 4:
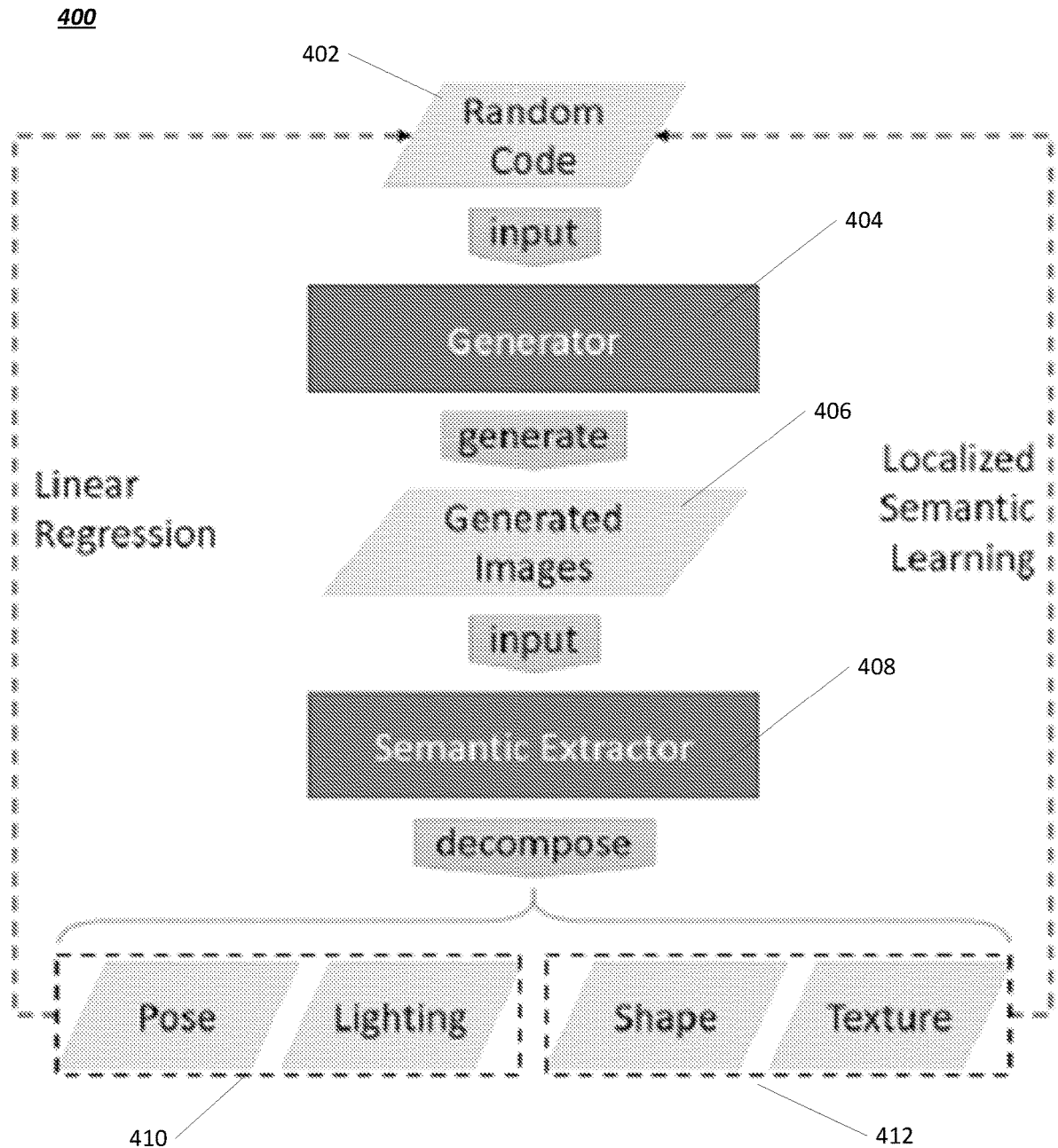
FIG. 4 is a schematic representation of the method for photorealistic image synthesis.

FIG. 4 shows one embodiment of a method 400 of the invention in which facial images may be manipulated by varying the facial semantics. In a first step, a random code 402, which, in some embodiments may be, for example, Gaussian noise, is input to generator 404 to generate a facial image 406. As described herein, the generator may be, for example, StyleGAN or StyleGAN-2, but other facial generators may also be used.

Once a facial image 406 has been generated by generator 404, semantic extractor 408 then extracts semantic features from the facial image. Semantic extractor 408 may be a network trained to extract specific semantic features from the facial image. For example, the semantic extractor 408 shown in the exemplary embodiment of FIG. 4 has been trained to extract semantic features representing pose, lighting, shape and texture.

Various semantic features 410 may be manipulated without changing the identity of the facial image. For example, semantic features representing pose and lighting can be manipulated and the identity of the facial image will not change. For identity-invariant features 412, for example, pose and lighting, the features may be extracted using a linear regression model.

Other semantic features 412 may be manipulated only to a certain extent before they become identity-variant. That is, if these features are changed too much, then the facial image 406 assumes a new identity. Such features 412 may be extracted via a localized semantics learning method. In the end, a vector of a certain length (which may be, in some embodiments, 512) for each independent semantic is acquired. By sampling along the acquired vectors, the associated semantic changes accordingly.

The overall design of the disclosed system can be sued for photo manipulation with a target demand. This is particularly useful in data augmentation for tasks that require a large number of training data but wherein only a limited number of training samples are available. The code-to-image generator to image-to-code-to-image generator can also be replaced, such that the generated images are identical to the input image. Additionally, the method may be used for image editing wherein the disentangled semantics are used to perform directed editing demands to modify the image.

An unsupervised learning framework for disentangling linear-encoded facial semantics from facial images generated by StyleGAN has been disclosed herein. The system can robustly decompose facial semantics from any single view GAN generation and disentangle facial semantics. Additionally, a method to perform guided data augmentation to counteract the problem brought by unbalanced data is disclosed.

As would be realized by one of skill in the art, the disclosed method described herein can be implemented by a system comprising a processor and memory, storing software that, when executed by the processor, performs the functions comprising the method.

As would further be realized by one of skill in the art, many variations on implementations discussed herein which fall within the scope of the invention are possible. Moreover, it is to be understood that the features of the various embodiments described herein were not mutually exclusive and can exist in various combinations and permutations, even if such combinations or permutations were not made express herein, without departing from the spirit and scope of the invention. Accordingly, the method and apparatus disclosed herein are not to be taken as limitations on the invention but as an illustration thereof. The scope of the invention is defined by the claims which follow.

The invention claimed is:

1. A method comprising:
obtaining a random facial image;
inputting the facial image to a semantic extractor trained to extract a feature vector representing one or more semantic features from the facial image;
decomposing the feature vector to extract one or more vectors representing specific features of the facial image;
sampling the one or more vectors representing the specific features;
modifying the extracted feature vector using the sampled vectors; and
generating a new, modified version of the facial image using the modified feature vector;
wherein vectors for identity-invariant features are extracted using a linear regression model; and
wherein vectors for identity-variant features are extracted using a localized semantics learning method.

2. The method of claim 1 wherein the random facial image is generated by a generative adversarial network based on a random input.

3. The method of claim 2 wherein the generative adversarial network is StyleGAN or StyleGAN-2.

4. The method of claim 2 wherein the random input is a latent code generated from a Gaussian distribution.

5. The method of claim 4 further comprising:
mapping the latent code to a disentangled latent space; and
performing decorrelation regularization on the disentangled latent space.

6. The method of claim 5 wherein the decorrelation regularization is implemented using a decorrelation loss function.

7. The method of claim 6 wherein the mapping is implemented with a mapping network and further wherein the decorrelation loss function is applied only to the mapping network.

8. The method of claim 5 further comprising:
performing linear encoding of the semantic features in the disentangled latent space.

9. The method of claim 8 wherein the linear encoding is performed using an estimated semantic gradient.

10. The method of claim 1 wherein extracted vectors for identity-variant features
capture interpretable combinations of pixel variations in the semantic feature vectors.

11. The method of claim 1 further comprising:
using the vectors representing specific features of the facial image as training data for the generative adversarial network to reconstruct the facial image using a reconstruction loss.

12. The method of claim 11 further comprising:
using facial images generated by the trained generative adversarial network to train a deformable face reconstruction method.

13. A system comprising:
a processor; and
memory, storing software that, when executed by the processor, performs the method of claim 1.

14. A system comprising:
a processor; and
memory, storing software that, when executed by the processor, performs the method of claim 12.

* * * * *